United States Patent [19]
McCranie

[11] Patent Number: 5,705,736
[45] Date of Patent: Jan. 6, 1998

[54] APPARATUS FOR TESTING A WELD SEAM

[76] Inventor: Rema N. McCranie, Rte. 1 Box 332, Coolidge, Ga. 31738

[21] Appl. No.: 710,835

[22] Filed: Sep. 23, 1996

[51] Int. Cl.[6] .................................................. G01M 3/02
[52] U.S. Cl. ................................................................ 73/37
[58] Field of Search ........................... 173/37, 150 A, 173/850

[56] References Cited

U.S. PATENT DOCUMENTS

| | | | |
|---|---|---|---|
| 2,222,079 | 11/1940 | Larson | 73/37 |
| 2,694,924 | 11/1954 | Matlock et al. | 73/37 |
| 2,842,957 | 7/1958 | Bacon, Jr. | 73/37 |
| 3,285,056 | 11/1966 | Mattivi | 73/37 |
| 3,712,112 | 1/1973 | Widmer et la. | 73/37 |
| 4,019,370 | 4/1977 | Allocco, Jr. | 73/45.1 |
| 4,043,179 | 8/1977 | Ingle, Jr. | 73/37 |
| 4,610,166 | 9/1986 | Elder et al. | 73/818 |
| 5,127,260 | 7/1992 | Robertson | 73/37 |
| 5,140,848 | 8/1992 | Spencer | 73/46 |
| 5,390,532 | 2/1995 | Anthony | 73/40.5 |

*Primary Examiner*—Elizabeth L. Dougherty
*Attorney, Agent, or Firm*—Peter Loffler

[57] ABSTRACT

An apparatus for testing a weld seam between two overlapping sheets of polyethylene comprises a nozzle in air flow communication with an air pressure gauge and an air valve. A clamping device securely holds the nozzle within the air passage located between two parallel weld seams of the overlapped polyethylene sheets and maintains a closed air system. The closed air system is pressurized to a desired air pressure level and maintained at this level for a desired length of time. A drop in air pressure, which is the result of a failure in the weld seam, is quickly noted upon the air pressure gauge permitting corrective action.

6 Claims, 3 Drawing Sheets

APPARATUS FOR TESTING A WELD SEAM

BACKGROUND OF THE INVENTION

1. Field of the Invention

The present invention relates to an apparatus to test a weld seam and more particularly for an apparatus to test a weld seam between two overlapping sheets of polyethylene liner.

2. Background of the Prior Art

In recent years, waste storage facilities have been required to line the bottom of the waste containment area to prevent waste leakage therefrom. The liner must be made from an impervious material that prevents any waste penetration. The liner material of choice is polyethylene or plastic. Several sheets of the polyethylene are laid across the bottom and sides of the waste containment area in order to completely line the containment area and thereby completely contain the waste deposited therein. As several sheets are used to complete this task, the sheets must be properly joined to one another to prevent waste seepage. As polyethylene is an inert material which does not succumb to gluing, the sheets must be welded to one another. Toward this end, two sheets are overlapped and welded at the edge of each sheet creating two parallel weld seams a short distance apart with a small sealed passage therebetween.

After the sheets are welded, the weld seams must be tested to insure that the welding was performed properly. The current preferred test method is to fill the sealed passage between the two seams with air or other gas to a predetermined pressure level. The pressurization level is held for a certain length of time and the seams must hold this pressurization without leaking. If a leak is detected, the seam must be rewelded.

The current method for performing this pressurization test is for a worker to puncture the sealed passage with a syringe-like device having a pressure gauge thereon, and holding the device in place for the predetermined length of time. The worker must hold and remain with the test equipment throughout the duration of the test. This method of testing is very inefficient in that it requires a worker's active participation for the entire length of the testing process. This can require a substantial expenditure of labor especially when dozens of seams require testing at a particular job-site. Furthermore, pressure leak will occur around the puncture area.

Therefore, there is a need in the art for a device that can pressure test a pair of parallel weld seams existing between two overlapping sheets of polyethylene. Such a device must be able to maintain the test for any desired length of time without the need for continuous worker involvement. Such a device should be easy to construct and to use.

SUMMARY OF THE INVENTION

The apparatus for testing a weld seam of the present invention meets the aforementioned needs in the art. The device will pressurize the air passage located between two parallel weld seams of overlapped polyethylene sheets to a desired air pressure level and hold that level for an indefinite length of time. Any failure in either of the seams results in a drop of air pressure level, which pressure drop is readily captured by the device and communicated to the user.

The device comprises a nozzle that is insertable into the air passage. The nozzle is in air flow communication with an air pressure gauge and an air valve. The air valve receives a pressurized air source and urges the pressurized air through the nozzle into the air passage. A clamping device attaches to the nozzle, air pressure gauge, and the air valve. The clamping device has an upper and lower pressure plate that fit around the nozzle. When the nozzle is in place within the air passage, the clamping device is tightened so that the upper and lower pressure plates clamp around the nozzle creating an air-tight seal between the polyethylene of the air passage and the nozzle. The clamping device will maintain this air-tight seal without involvement from a worker.

Once the nozzle is securely in place, the air passage is pressurized to a desired air pressure level. This is achieved by connecting a pressurized air source to the air valve and urging the pressurized air therethrough into the air passage until the desired level of pressurization is achieved. Thereafter, the device is maintained in place for a desired length of time. If a seam fails, the air pressure level will drop and this drop will be registered upon the air pressure gauge. If such a drop is registered, the faulty seam can be identified and corrective action can be taken.

The device is of relatively simple and inexpensive construction. The device is easy to use, requiring a very short time to install within the test area. Once installed, the device can be left unattended in order to perform the pressurization test, thereby freeing the worker to perform other tasks as needed.

BRIEF DESCRIPTION OF THE DRAWINGS

Similar reference numerals refer to similar parts throughout the several views of the drawings.

DETAILED DESCRIPTION OF THE PREFERRED EMBODIMENT

Figure 1:
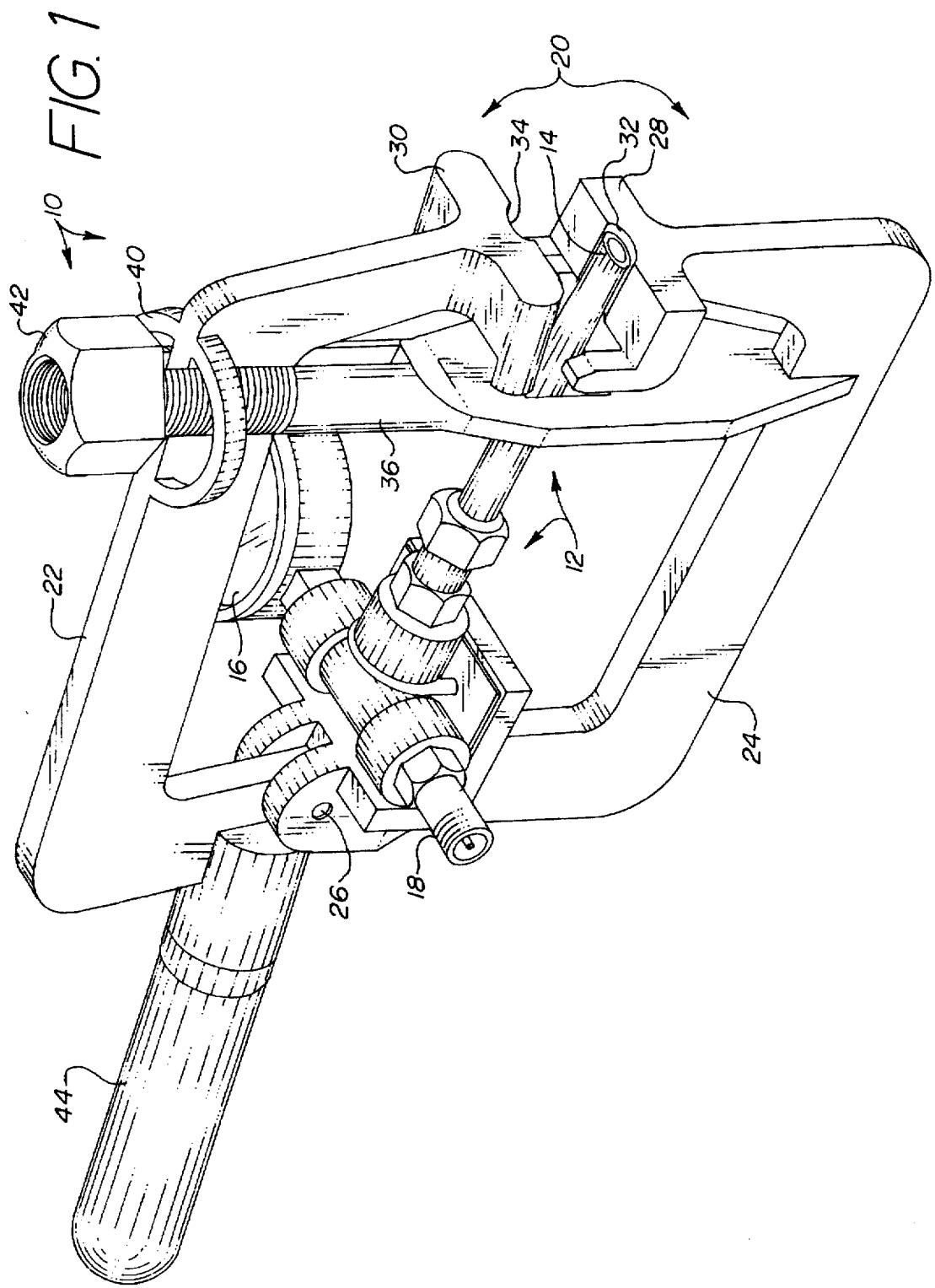
FIG. 1 is a perspective view of the apparatus for testing a weld seam of the present invention.
Figure 2:
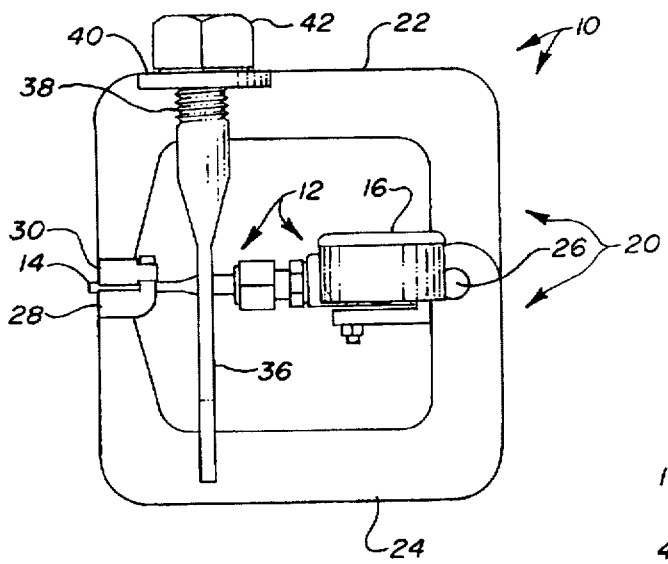
FIG. 2 is a side elevation view of the apparatus for testing a weld seam.
Figure 3:
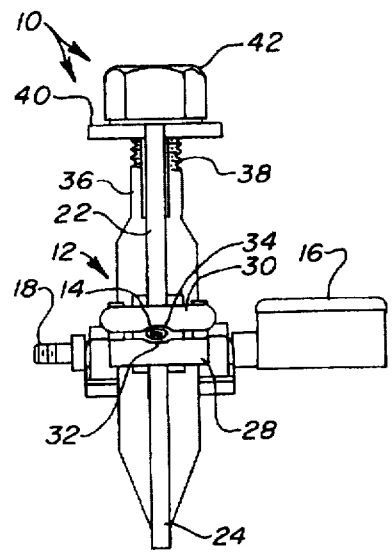
FIG. 3 is a front elevation view of the apparatus for testing a weld seam.
Figure 4:
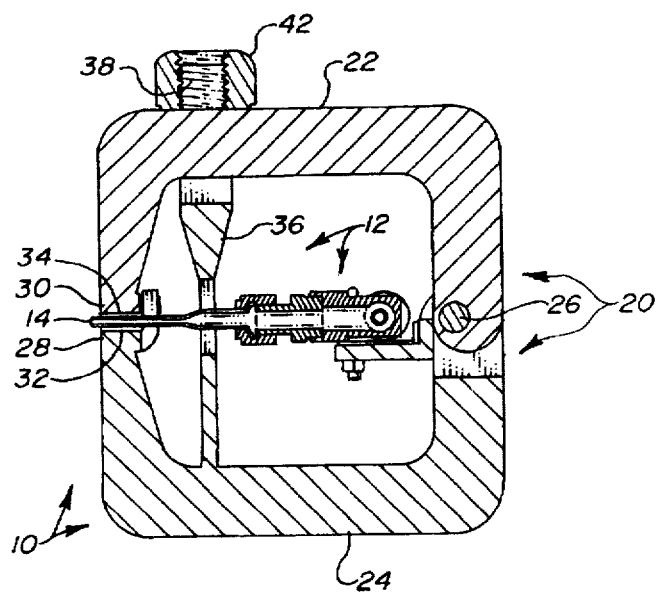
FIG. 4 is a cutaway view of FIG. 2.
Figure 5:
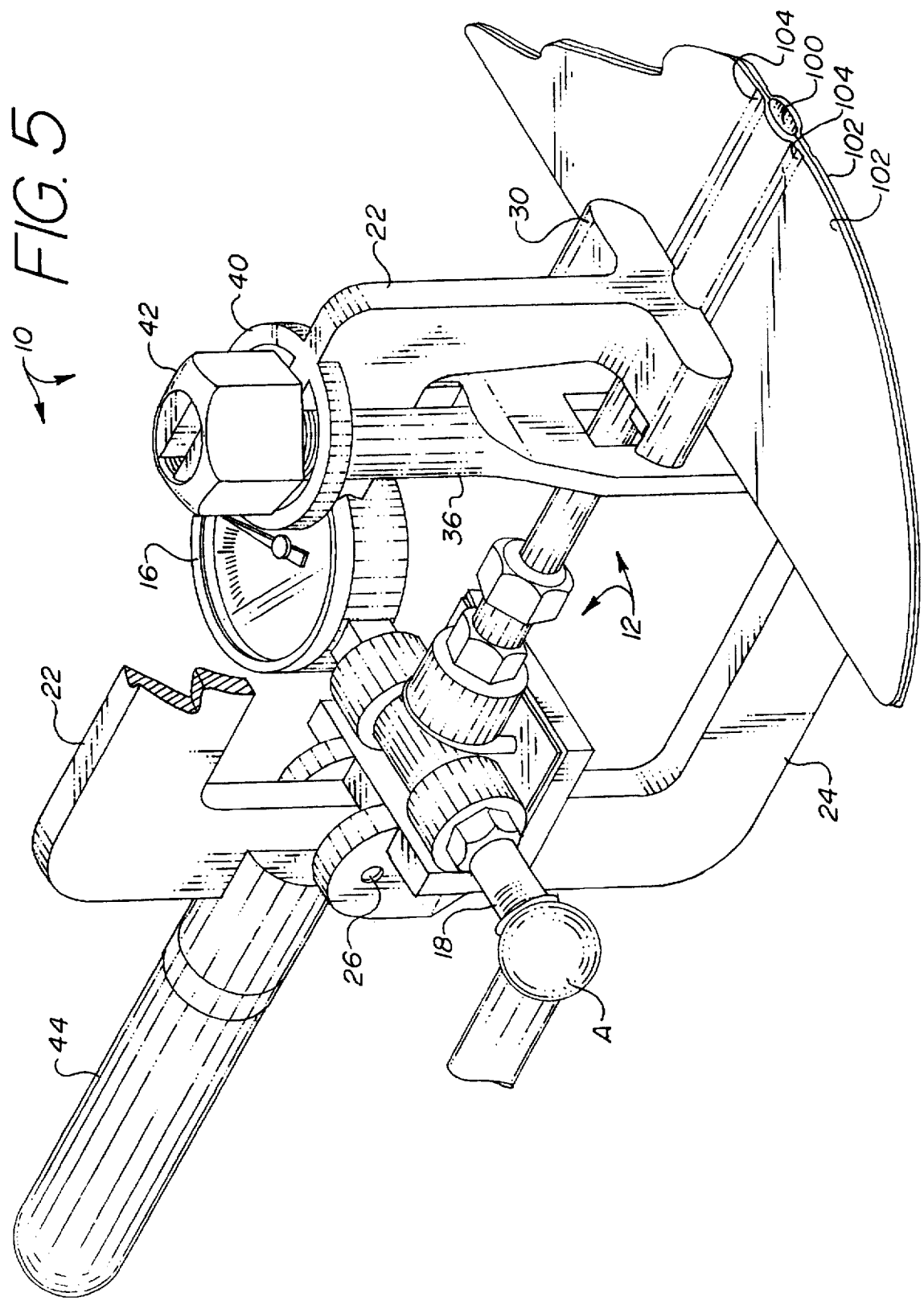
FIG. 5 illustrates the apparatus for testing a weld seam installed in the test location.

Referring now to the drawings, it is seen that the apparatus for testing a weld seam of the present invention, generally denoted by reference numeral 10, comprises a pressurizer 12 which is comprised of an air nozzle 14. The nozzle 14 is dimensioned to be inserted into the air passage 100 existing between two overlapped sheets of polyethylene 102 having two parallel weld seams 104, in spaced apart relation to one another, joining the two sheets 102. Generally, the air passage 100, is either circular, or more often, elliptical. The air nozzle 14 is in air flow communication with an air pressure gauge 16 and an air valve 18.

The pressurizer 12 is held within a clamping device 20 which holds the nozzle 14 properly in place within the air passage 100. The clamping device 20 can be comprised of a modified C-clamp as shown. The clamping device 20 can be comprised of an upper arm 22 and a lower arm 24, pivotally attached to each other at a pivot point 26. Ideally, the pressurizer is attached to the clamping device 20 at pivot point 26. Located at the end of the lower arm 24 is a lower pressure plate 28, while an upper pressure plate 30 is located on the end of the upper arm 22. A first depression 32 is located on the face of the lower pressure plate 28, while a second depression 34 is located on the face of the upper pressure plate 30. The first depression 32 is in corresponding shape to the lower half of the nozzle 14 while the second depression 34 is in corresponding shape to the upper half of the nozzle 34. A securement arm 36 is attached to the lower arm 24 and extends above the upper arm 22. The upper arm 22 passes through the upper portion of the securement arm 36. The upper portion of the securement arm 36 is threaded 38 and passes through a securement plate 40 integrally located on the upper arm 22. A securement nut 42 is located on the threaded portion 38 of the securement arm 36. Rotation of the securement nut 42 downward about the threaded portion 38 causes the upper arm to be brought closer to the lower arm 24 thereby tightening the clamping device 10 while rotation of the securement nut 42 upward along the threaded portion 38 causes loosening of the clamping device 10.

It is expressly understood that any other appropriate clamping device can be utilized with the present apparatus in order to clamp the upper plate to the lower plate in order to hold the nozzle 14 securely in place within the air passage 100 without departing from the scope or spirit of the invention.

A handle 44 may be attached to the device 10 at any appropriate location.

In order to utilize the apparatus for testing a weld seam, the nozzle 14 is inserted into the air passage 100. The upper pressure plate 30 aknd the lower pressure plate 28 receive the nozzle 14 within their respective depressions. The securement nut 42 is rotated downward about the threaded portion 38 in order to tighten the clamping device 20. This causes the upper pressure plate 30 to be brought tightly toward the lower pressure plate 28 thereby clamping the nozzle 14 within the air passage 100 and creating an air-tight seal around the nozzle 14. A pressurized air source (not illustrated) is attached to the air valve 18. The pressurized air source causes pressurized air to be urged into the air passage 100 through the nozzle 14. The pressurized air source is maintained in place until the desired level of air pressure is contained within the air passage 100. The level of air pressure within the air passage 100 is metered by the air pressure gauge 16. Once the desired level of air pressure is achieved, the pressurized air source is disconnected from the air valve 18. If any initial perforations in the either of the weld seams exist, the desired air pressure level will not be achieved and corrective action can be taken.

Once the pressurized air source is disconnected from the air valve 18, a closed air system is achieved. Within this closed air system, air pressure levels are maintained at a constant level. As such, the level of air pressure within the air passage 100 will be maintained at the desired level. The clamping device 10 will maintain the apparatus 10 in place for an indefinite length of time without any further worker involvement. This frees the worker to perform other tasks during the test period. If a seam 104 fails during the test period, the air pressure level will drop within the closed air system. The drop in pressure level will be readily noted by the air pressure gauge 16 permitting corrective action to be taken.

Upon completion of the pressure test, the device 10 is declamped from the air passage 100 and removed.

While the invention has been particularly shown and described with reference to an embodiment thereof, it will be understood by those skilled in the art that various changes in form and detail may be made without departing from the spirit and scope of the invention.

I claim:

1. A device for testing weld seams between two overlapping sheets of polyethylene creating an air passage therebetween comprising:

a nozzle for insertion into the air passage;

an air valve, in air flow connection with the nozzle, for receiving pressurized air;

an air gauge, in air flow connection with the nozzle, for gauging the air pressure registerable within the nozzle;

an upper arm having a securement plate;

a lower arm pivotally attached to the upper arm;

a first pressure plate having a first depression attached to an end of the upper arm;

a second pressure plate having a second depression attached to an end of the lower arm:

a securement arm having a threaded upper portion attached to the lower arm and extending through the securement plate:

a securement nut located on the threaded portion; and wherein rotation of the securement nut articulates the upper arm toward the lower arm securing the nozzle within the first depression and the second depression while counterrotation of the securement nut articulates the upper arm away from the lower arm.

2. The device as in claim 1 wherein the nozzle is generally circular in shape.

3. The device as in claim 1 wherein the nozzle is generally elliptical in shape.

4. The device as in claim 1 to further include a handle attached to the upper arm.

5. A device for testing weld seams between two overlapping sheets of polyethylene creating an air passage therebetween comprising:

a generally elliptical-shaped nozzle for insertion into the air passage;

an air valve, in air flow connection with the nozzle, for receiving pressurized air;

an air gauge, in air flow connection with the nozzle, for gauging the air pressure registerable within the nozzle;

an upper arm having a securement plate;

a lower arm pivotally attached to the upper arm;

a first pressure plate having a first depression attached to an end of the upper arm;

a second pressure plate having a second depression attached to an end of the lower arm;

a securement arm having a threaded upper portion attached to the lower arm and extending through the securement plate;

a securement nut located on the threaded portion; and wherein rotation of the securement nut articulates the upper arm toward the lower arm securing the nozzle within the first depression and the second depression while counterrotation of the securement nut articulates the upper arm away from the lower arm.

6. The device as in claim 5 further comprising a handle attached to the upper arm.

* * * * *